(12) United States Patent
Bushkin et al.

(10) Patent No.: US 10,154,116 B1
(45) Date of Patent: Dec. 11, 2018

(54) EFFICIENT SYNCHRONIZATION OF LOCALLY-AVAILABLE CONTENT

(71) Applicant: Amazon Technologies, Inc., Seattle, WA (US)

(72) Inventors: Leopold Bushkin, Bellevue, WA (US); Saket Saurabh, Seattle, WA (US); Rajendra Kumar Vippagunta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 15/197,581

(22) Filed: Jun. 29, 2016

(51) Int. Cl.
*H04L 29/08* (2006.01)
*G06F 3/0485* (2013.01)

(52) U.S. Cl.
CPC .......... *H04L 67/327* (2013.01); *G06F 3/0485* (2013.01)

(58) Field of Classification Search
CPC .............. H04L 63/0428; H04L 63/0421; H04L 63/104; H04L 67/1097; H04L 67/42; H04L 67/327; H04L 9/0816; G06F 21/6218; G06F 21/6272; G06F 2221/2107; G06F 3/0485; G06Q 30/0246
See application file for complete search history.

(56) References Cited

U.S. PATENT DOCUMENTS

| 9,053,124 | B1* | 6/2015 | Dornquast | .......... H04L 67/1072 |
| 9,876,637 | B2* | 1/2018 | Gauda | ................. G06F 21/6218 |
| 2004/0091116 | A1* | 5/2004 | Staddon | ............. G06Q 20/3829 |
| | | | | 380/277 |
| 2009/0037500 | A1* | 2/2009 | Kirshenbaum | ... G06F 17/30097 |
| 2012/0317307 | A1* | 12/2012 | Ravindran | .......... H04L 12/6418 |
| | | | | 709/238 |
| 2013/0305039 | A1* | 11/2013 | Gauda | ................. G06F 21/6218 |
| | | | | 713/153 |
| 2014/0003421 | A1* | 1/2014 | Alicherry | ............ H04L 67/1095 |
| | | | | 370/389 |
| 2014/0108643 | A1* | 4/2014 | Hui | ......................... H04L 45/48 |
| | | | | 709/224 |
| 2015/0178769 | A1* | 6/2015 | Mirisola | ............. H04L 63/0421 |
| | | | | 705/14.45 |
| 2017/0180412 | A1* | 6/2017 | Mikulski | ............. H04L 63/1433 |
| 2017/0249659 | A1* | 8/2017 | Shroff | ................ G06Q 30/0244 |
| 2017/0255675 | A1* | 9/2017 | Chavan | ............ G06F 17/30466 |
| 2017/0329857 | A1* | 11/2017 | Klotz, Jr. | .......... G06F 17/30867 |

* cited by examiner

*Primary Examiner* — Alina A Boutah
(74) *Attorney, Agent, or Firm* — Knobbe, Martens, Olson & Bear, LLP (57) ABSTRACT

Features are provided for the use of persistent connections and efficient content synchronization in content delivery environments. A content management system may provide content feeds to user devices using a persistent duplex connection over which the content management system and user devices may communicate asynchronously. By using a persistent duplex connection to asynchronously communicate with user devices, the content management system can provide content for the content feeds while, in parallel, receiving requests and commands from the user devices, responding to the requests and commands, and transmitting other requests and commands to the user devices. In addition, the content management system and a particular user device can exchange information regarding the content items that the user device has or should have already received.

21 Claims, 8 Drawing Sheets

EFFICIENT SYNCHRONIZATION OF LOCALLY-AVAILABLE CONTENT

BACKGROUND

Generally described, computing devices and communication networks can be utilized to exchange content and other information. In a common application, a computing device can generate content to be distributed to other computing devices via a communication network. For example, a user of a computing device, such as a personal computer, laptop computer, tablet computer, or smart phone, may use the computing device to create content, such as text, documents, audio recordings, video, images, animations, and the like. The content may be transmitted directly to other users' computing devices, or the content may be transmitted to a network-accessible content server for distribution to other users' computing devices.

From the perspective of a user requesting and viewing content, a user experience can be defined in terms of the performance and latencies associated with obtaining the content from content servers and displaying the content on the user's device. In this process, a user obtaining content from a content server may have a better experience over a wired network connection or Wi-Fi connection than over slower wireless networks, such as 3G/4G cellular networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to the use of persistent network connections and efficient content synchronization between computing devices in content delivery environments. A content management system may provide content feeds to user devices over persistent duplex connections. Content feeds are typically continuous streams or discrete sets of content items (or data about content items) provided to user devices, either automatically or on-demand. By using a persistent duplex connection to asynchronously communicate with user devices, the content management system can provide content for the content feeds while, in parallel, receiving requests and commands from the user devices, responding to the requests and commands, and transmitting other requests and commands to the user devices. In this way, the content management system can be responsive to operations performed at the user devices (e.g., navigating content feeds, selecting individual content items, etc.) while continuing to provide content or perform other operations that may be needed. In addition, a content management system and a particular user device can exchange information regarding the content items that the user device has already received or should have already received. Accordingly, the content management system can more efficiently provide content to the user device by avoiding the retransmission of content items that the user device has already received, thereby conserving power, bandwidth, and other resources.

Some aspects of the present disclosure relate to the establishment, maintenance, and use of special network connections between a content management system and a user device. Rather than establishing a new connection for each request and then closing the connection after receiving a response, the user device can establish and maintain a persistent duplex connection with the content management system. The connection is persistent because it may remain open after receiving a response to the initial request transmitted to the content management system. Whereas more conventional connections would be automatically closed after a "timeout" period expires, the persistent connection may remain open for an indeterminate period of time until closed by the user device or the content management system. Thus, when the user device is ready to transmit another request or command to the content management system, the user device can do so over the previously-established persistent connection without negotiating the establishment of a new connection. The connection is duplex because the content management system and user device may transmit commands, requests, notifications, etc. to each other over the same connection and without first receiving an associated request from the other device. This persistent duplex connection facilitates asynchronous operations because the user device and/or content management system may transmit requests, commands, notifications, and the like without waiting for a response from the other device. Instead, the transmissions may be queued by the receiving device, and the receiving device can implement a prioritization strategy for processing the transmissions (e.g., executing commands, displaying received content, providing responses, etc.) in an order other than the order in which the transmissions were received.

Additional aspects of the present disclosure relate to the synchronization, between a user device and a content management system, of information regarding the content that the user device has already received and thus has available locally. Conventional content servers leverage client-side caching by providing the user device with a markup file referencing all content items that should be available on the user device; the user device is then typically responsible for checking the local cache and requesting any content that is not present (or expired). However, in such conventional systems, the same markup file is provided to all user devices regardless of prior content access history. In order to reduce or minimize the transmission of data regarding content items that should be available locally on a user device, a user device can proactively generate and provide data to the content management system regarding the content items that the user device has previously received and saved. For example, the user device may provide a compact, probabilistic data structure such as a Bloom filter that includes encoded information regarding the individual content items that the user device has available locally. The content management system can then use the data to determine which content to transmit to the user device and/or to determine which content to avoid re-transmitting to the user device. In some embodiments, the content management system may provide data regarding the content items that the user device should purge from local storage, the content items that the user device may retain in local storage, the content items that are higher priority or lower priority, etc. In this way, the user device and content management system can efficiently synchronize the current state of content available on the user device.

Although aspects of some embodiments described in the disclosure will focus, for the purpose of illustration, on particular examples of computing devices and interactions, the examples are illustrative only and are not intended to be limiting. In some embodiments, the techniques described herein may be applied to additional or alternative content, algorithms, or computing devices. Various aspects of the disclosure will now be described with regard to certain examples and embodiments, which are intended to illustrate but not limit the disclosure.

Network-Based Content Feed Delivery Environment

Figure 1:
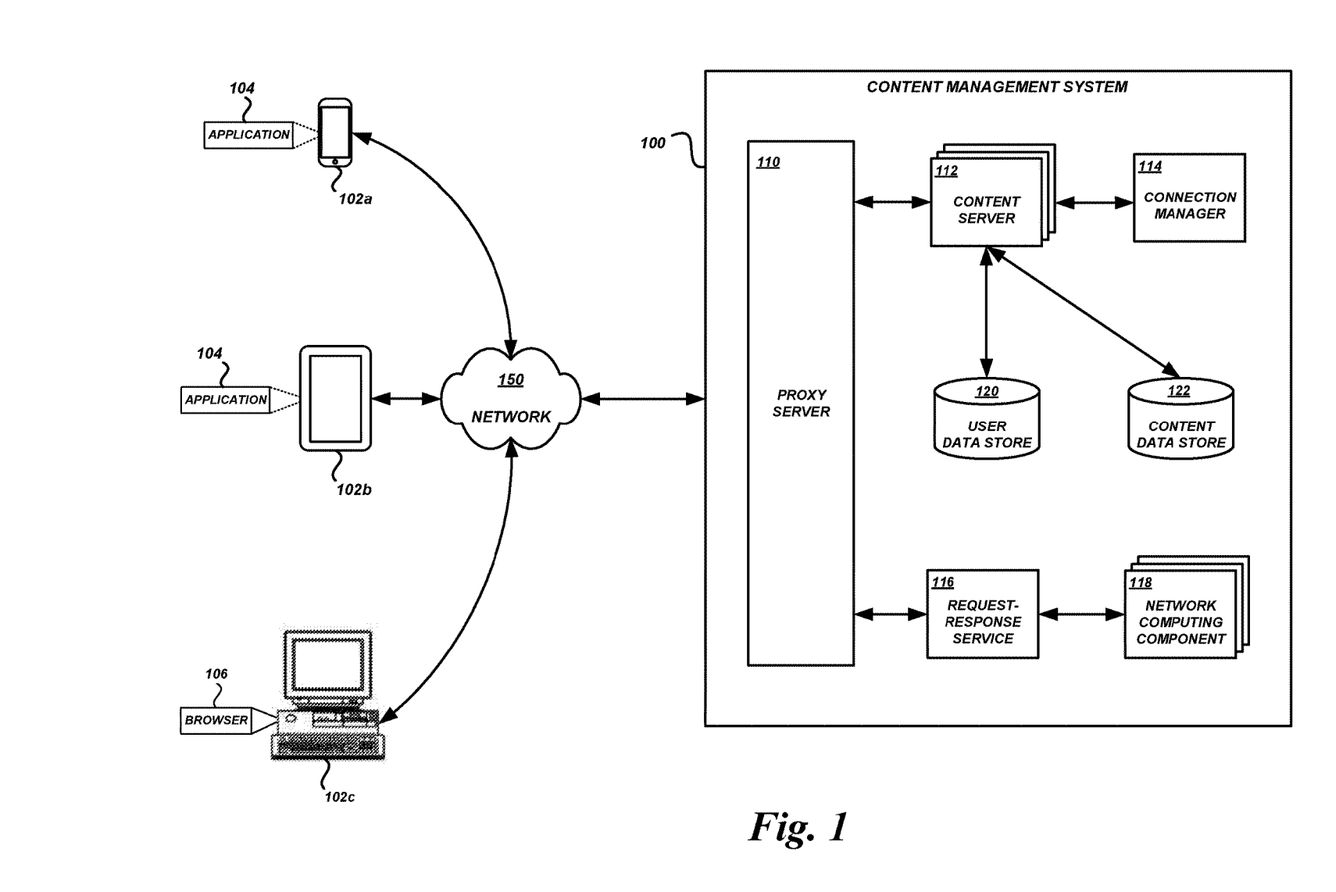
FIG. 1 is a block diagram of an illustrative computing environment including a content management system and various user devices according to some embodiments.

With reference to an illustrative embodiment, FIG. 1 shows a network environment in which aspects of the present disclosure may be implemented. As shown, the network environment may include a content management system 100 and various user devices 102*a*, 102*b*, and 102*c* (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a proxy server 110 configured to maintain secure persistent connections with user devices 102. The content management system 100 may also include any number of content servers 112 configured to provide content feeds to user devices 102 via the proxy server 110. A connection manager 114 can maintain and manage access to individual user devices 102 via the corresponding content servers 112 to which the user devices 102 have been assigned. The content management system 100 may include a request-response service 116 to provide a traditional request-response interface for interacting with the content servers 112 that are configured to communicate via persistent duplex connections. For example, various network computing components 118 may communicate with the content servers 112 to access content, transmit data to user devices 102, etc. The network computing components 118 may not be configured to establish and communicate via persistent duplex connections or may not be configured to communicate using a command-response protocol, but may nevertheless communicate with the content servers 112 through the request-response service 116 using a traditional request-response protocol.

The content management system 100 may also include various data stores to store data and/or files in connection with content feed generation. For example, the content management system 100 may include a user data store 120 to store data about individual users, including information regarding interests, demographic characteristics, browse history, user groupings, content collection associations, and the like. The content management system 100 may also include a content data store 122 to store the corpus of content items (or information about the content items) available to be distributed in content feeds.

The content management system 100 may be implemented on one or more physical server computing devices that provide computing services and resources to users. In some embodiments, the content management system 100 (or individual components thereof, such as the proxy server 110, content server 112, request-response service 116, etc.) may be implemented on one or more host devices, such as blade servers, midrange computing devices, mainframe computers, desktop computers, or any other computing device configured to provide computing services and resources. For example, a single host device may execute instances a proxy server 110, one or more content servers 112, a connection manager 114, and a request-response service 116. The content management system 100 may include any number of such hosts.

In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to access content feeds and/or generate content items managed by the content management system 100. In some embodiments, a user may launch specialized application software, such as a mobile application 104 executing on a particular user device, such as a smart phone 102*a* or tablet computer 102*b*. The application 104 may be specifically designed to interface with the content management system 100 for accessing content feeds and/or generating content items. In some embodiments, a user may use other application software, such as a browser application 106, to interact with the content management system 100.

When a user accesses an application 104 on a user device 102a to retrieve a content feed, the user device 102a may establish a persistent duplex connection with the content management system 100 via the network 150. The connection may be maintained at the content management system 100 by the proxy server 110. The proxy server 110 can perform load balancing among multiple user devices 102 and content servers 112. For example, the proxy server 110 may receive the incoming request from the user device 102a to establish the connection, and the proxy server 110 may identify a particular content server 112 of multiple content servers 112 available to serve a content feed to the user device 102a. The proxy server 110 can then maintain the persistent connection between the user device 102a and the identified content server 112 for the duration of the user's session. Illustratively, the connection may be a WebSocket connection or a connection established using some other bi-directional communication protocol. The proxy server 110 may be specially configured to maintain this connection (and other such connections) even when the connection appears to be idle. Thus, the user device 102a and/or content server 112 can use the connection throughout the content browsing session as-needed without requiring the connection to first be re-established every time or after expiration of a "timeout" period. In some embodiments the proxy server 110 may be implemented as an Nginx server.

The persistent duplex connection may be a secure connection. For example, the connection may be a secure sockets layer or "SSL" connection managed according to the Hyper Text Transfer Protocol Secure or "HTTPS" protocol. The proxy server 110 can act as a secure endpoint for the connection between the user device 102a and the content management system 100. The proxy server 110 can then communicate with a content server 112 (or multiple content servers 112) on behalf of the user device 102a without using a secure connection, or facilitate tunneled communication between the user device 102a and the content server 112 through the proxy server 110. For example, the persistent duplex connection between the user device 102a and the content server 112 (via the proxy server 110) may be a tunneled WebSocket connection over HTTPS. The HTTPS connection may be terminated at the proxy server 110, while the WebSocket connection may continue to the content server 112.

In response to a request for a content feed, the identified content server 112 can access user data regarding the user (or user device 102a, or instance of application 104, etc.) from the user data store 120. The content server 112 can then determine which content from the content data store 122 to include in the content feed that is sent to the user device 102a. Example systems and processes for selecting content to be included in a content feed are described in commonly-owned U.S. patent application Ser. No. 15/197,429, entitled LOW LATENCY PERSONALIZED CONTENT DELIVERY SYSTEM, and filed on Jun. 29, 2016, the contents of which are incorporated by reference herein. In some embodiments, other types of feeds or other transmissions may be made instead of, or in addition to, content feeds. For example, a server (or some other computing device) may provide a user device (or some other computing device) with a feed of in-app notifications. As another example, a feed of information regarding prior user activities may be provided.

Content servers 112 may be configured to use a command-response protocol, described in greater detail below, for communicating with the user devices 102 regarding the specific operations to be executed. For example, a content server 112 may communicate with a user device 102 by exchanging commands, responses, and the like over multiple logical communication channels. The logical communication channels, also referred to simply as "channels" for convenience, may be used to communicate over a single persistent network connection by multiplexing the transmissions associated with each respective channel. Each individual command, response, or other transmission may be associated with a particular channel. In addition, the content server 112 may assign each channel to a corresponding queue in which the commands, responses, and other transmissions received from the user device 102 may be stored. The content server 112 may implement a prioritization strategy to determine the particular channels to access at any given time, the order in which the channels are to be accessed, the responses to be sent and the order in which they are to be sent, etc. The user devices 102 may also implement queues corresponding to the various channels used to communicate with the content server 112. For example, the content server 112 may provide commands, responses, and other transmissions to the user device 102, and the user device 102 may store the commands, responses, and other transmissions in corresponding queues for processing. In some embodiments the user devices 102 and content servers 112 may be configured to perform the same core logic when queuing commands and responses, using the persistent duplex connection, etc.

Communication Over a Persistent Duplex Connection

Figure 2:
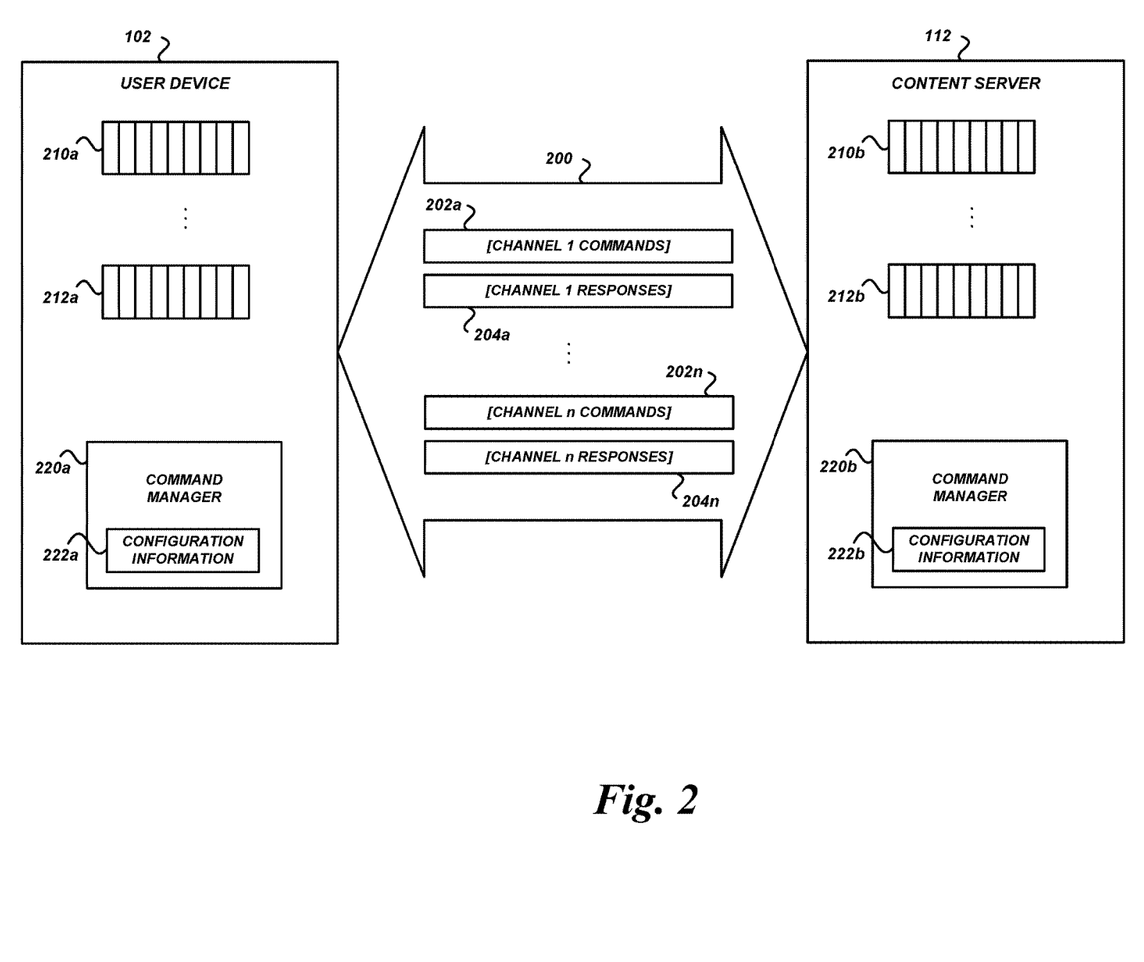
FIG. 2 is a block diagram of a user device communicating with a content management system over a persistent duplex network connection according to some embodiments.

FIG. 2 shows an illustrative user device 102 and an illustrative content server 112 communicating over a persistent duplex connection 200. As shown, the user device 102 may exchange commands 202a-202n and responses 204a-204n with the content server 112 over multiple channels, labeled channel 1 to channel n (where n is some positive integer). The user device 102 and content server 112 may each implement queues for the corresponding channels to store the channel transmissions (commands, responses, etc.) received from the other device. For example, the user device 102 may implement multiple queues 210a-212a to store channel transmissions received from the content server 112, and the content server 112 may implement multiple queues 210b-212b to store channel transmissions received from the user device 102. The number of queues may correspond directly to the number of channels used to communicate between the user device 102 and content server 112 (e.g., if there are n channels, the user device 102 and content server 112 may each implement n queues). In some embodiments, the user device 102 or content server 112 may implement a different number of queues than channels, or the user device 102 may implement a different number of queues than the content server 112.

The individual channels may each correspond to a different type of communication between the user device 102 and the content server 112. For example, channel 1 may be used to request and provide content items for the user's content feed. Another channel, such as channel n, may be reserved by default for transmissions related to management of the persistent connection and content browse session (e.g., status pings, subscription notifications, disconnect requests, etc.). Other channels may be implemented and used for other purposes (e.g., content server 112 notifications to the user device 102, tracking data to the content server 112 regarding non-command-based interactions at the user device 102, etc.). In some embodiments, the user device 102 and/or content server may dynamically create a new channel. For example, a user device 102 may dynamically create a new channel by assigning a particular command to a new channel identifier that is not currently in use (e.g., channel n+1). Upon receipt of the command associated with the new channel identifier, the content server 112 can establish a corresponding queue and process the command according to the prioritization strategy implemented by the content server 112.

The user device 102 and content server 112 may each use a management component, such as the command manager 220a and 220b, respectively, to manage the execution of commands (or processing of other transmissions) in the various queues. In some embodiments, the command managers 220a, 220b may use a round-robin process to execute commands. For example, the command manager 220b of the content server 112 may access queue 210b, corresponding to channel 1, and obtain the next command in the queue 210b. The command manager 220b may then initiate execution of the command. Illustratively, the command may correspond to a request for a content feed (e.g., an "open/feed" command, in which the first term is the action to be performed, and the second term is the object on which—or with which—the action is to be performed). After initiating execution of the command, the command manager 220b can access the next queue, initiate the next command in the next queue, and so on until reaching the last queue 212b, corresponding to channel n. Once all queues have been accessed and the first available command (or other item) in each queue has been initiated (or otherwise processed), the command manager 220b can return to the first queue 210b and repeat the process. By using this round-robin process, the command manager 220b can ensure that no queue sits idle (e.g., without execution of any stored commands) for longer than any other queue.

Within individual queues, the commands may be accessed and executed in sequential order, using to a first-in-first-out ("FIFO") pattern. However, because there are multiple queues and there may be no requirement that each queue has the same number of stored commands, the entire collection of pending commands is not necessarily executed in sequential order. Indeed, some channels may have many commands (e.g., dozens, hundreds, or more) and a high rate at which new commands are received, while other channels may experience less traffic and have few or no commands queued for execution at any given time. Thus, an implicit prioritization may be implemented by reserving low-volume channels (and corresponding small or empty queues) for the highest-priority commands.

In some embodiments, the command manager 220b may use techniques other than a strict round-robin process for determining which command to execute next, and the order in which the queues are accessed. For example, the command manager 220b may access some queues (those associated with high-priority channels or channels in which low latency is otherwise desired) more frequently than other queues (those associated with low-priority channels or channels in which higher latency is tolerable). As another example, the command manager 220b may apply some alternative ordering or priority of execution to commands within the queues, instead of using the FIFO pattern that is traditionally followed when using queues.

As shown in FIG. 2, the user device 102 and content server 112 may implement queues, command managers, and channel communications symmetrically. For example, the user device 102 and content server 112 may each have the same number of queues, and the command managers 220a and 220b may each manage execution of the commands or other transmissions in the queues using the same process (e.g., round-robin among queues, FIFO within queues, etc.). The combination of this symmetric configuration and the asynchronous command-response protocol described below can allow the user device 102 and content server 112 to act as peers, rather than acting as traditional clients and servers that behave differently than each other. For example, the content server 112 may consider the user device 102 as merely one of many separate but equal devices with which the content server 112 interacts, including other user devices 102, other content servers 112, various network computing components 118, etc.

Although the user device 102 and content server 112 may implement queues, command managers, and channel communications symmetrically, the user device 102 may execute commands and process other communications differently than the content server 112. In some embodiments, due to different hardware of the user device 102 and content server 112, the low-level execution details for executing commands may be different between the user device 102 and the content server 112. In some embodiments, due to the different high-level uses of the user device 102 and content server 112, the commands may involve different operations. For example, when a user device 102 is processing a command to obtain more detail regarding a particular content item, the user device 102 may generate a second command and transmit the second command to the content server 112 over channel 1, as shown in FIG. 2 at 202a. The content server 112 can then receive the second command, store it in queue 210b, and eventually execute the second command by querying the content data store 120 and providing a response back to the user device 102 over channel 1 as shown in FIG. 2 at 204a. In contrast, when the content server 112 is performing an operation in which additional detail about a content item is needed, the content server 112 would not generate a command and transmit the command to the user device 102 over one of the channels. Instead, the content server 112 can access the content data store 120 and obtain the desired content. The two operations may involve the same initial command (e.g., a "get/content" command), but the execution of the command differs depending upon whether the user device 102 or content server 112 is executing the command.

The command manager 220a or 220b may determine how individual commands are to be executed on a particular device based on implementation specifications that are available to the corresponding command manager 220a or 220b. For example, the specific implementation details for executing the commands may be stored by the or otherwise accessed by the command managers 220a and 220b in configuration data 222a or 222b, respectively.

Command-Response Protocol

Figure 3A:
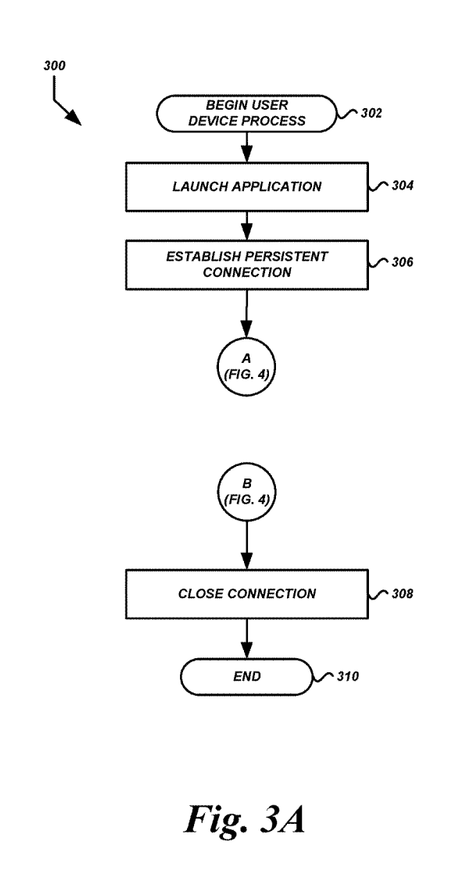
FIG. 3A is a flow diagram of an illustrative processes for a user device to communicate with a content management system during a content browsing session according to some embodiments.
Figure 3B:
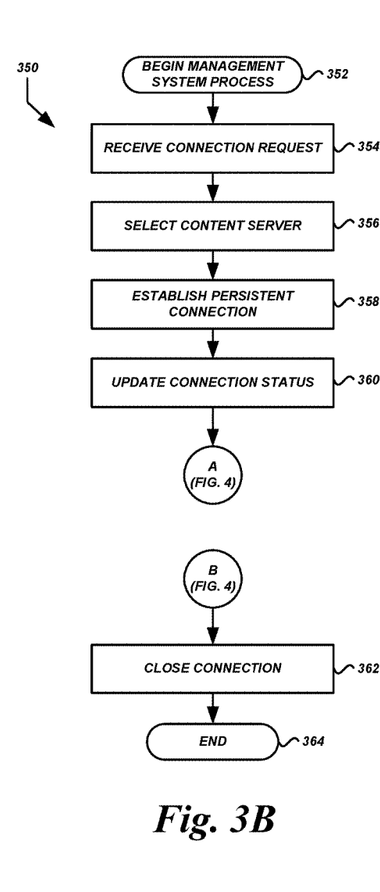
FIG. 3B is a flow diagram of an illustrative processes for a content management system to communicate with a user device during a content browsing session according to some embodiments.
Figure 4:
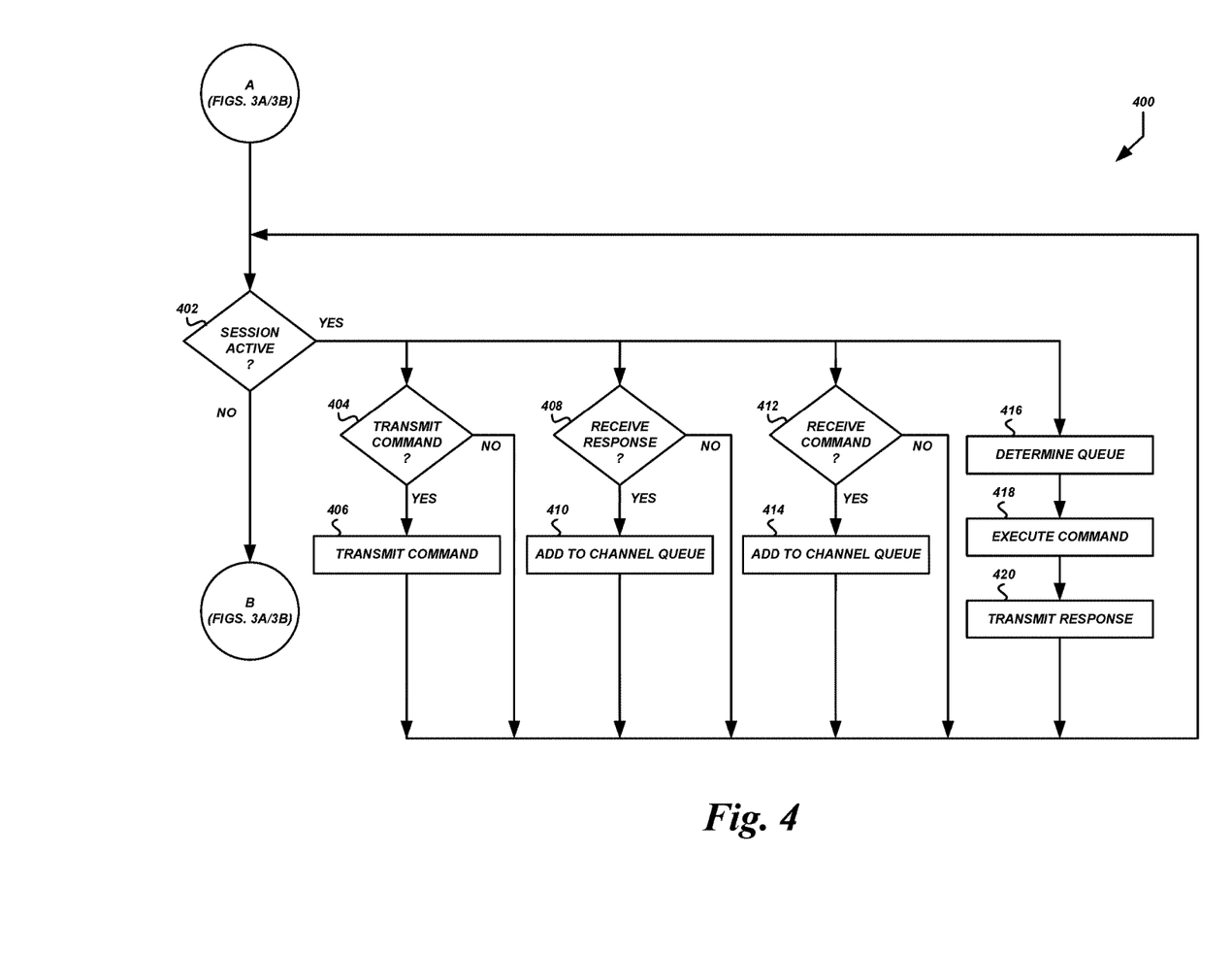
FIG. 4 is a flow diagram of an illustrative process for a computing system to manage a content browsing session using a command-response protocol according to some embodiments.

FIGS. 3A, 3B, and 4 are flow diagrams of illustrative processes that may be executed by user devices 102 and the content management system 100 to implement an asynchronous command-response protocol for communicating over a persistent duplex connection. As described above, the core process may be the same at both the user device 102 and the content management system 100. An example of the core process 400 is illustrated in FIG. 4. FIGS. 3A and 3B illustrate processes 300 and 350 that include operations of user device 102 and content management system 100, respectively, that may fall outside of the core process 400. The processes 300, 350, and 400 will be described with reference to FIGS. 5A and 5B, which are pictorial diagrams of a user device 102 at various stages during the processes.

The user device process 300 shown in FIG. 3A begins at block 302. The process 300 may begin in response to an event, such as when the user device 102 is powered on, when execution of an application 104 begins, etc. When the process 300 is initiated, a set of executable program instructions stored on one or more non-transitory computer-readable media (e.g., hard drive, flash memory, removable media, etc.) may be loaded into memory (e.g., random access memory or "RAM") of the user device 102. The executable instructions may then be executed by a hardware-based computer processor (e.g., a central processing unit or "CPU") of the user device 102. In some embodiments, the process 300 or portions thereof may be implemented on multiple processors, serially or in parallel.

At block 304, an application 104 may be accessed by a user of the user device 102. Illustratively, the application 104 may be specially configured to communicate with the content management system 100 for requesting and displaying content feeds. In some embodiments, a different application such as a browser application 106 may be used.

At block 306, the application 104 or some other module or component of the user device 102 may establish a persistent duplex connection with the content management system 100. For example, the application 104 may establish a secure connection to a proxy server 110 of the content management system 100, and a tunneled WebSocket connection through the secure connection to a particular content server 112.

Upon establishment of the connection or at some time thereafter, the application 104 may transmit a command to, or receive a command from, the content server 112 as part of a content browsing session. The core process 400 for handling the commands exchanged during the browsing session is shown in FIG. 4 and described in greater detail below. When the browsing session comes to an end (e.g., through user action or inaction, content server 112 command, etc.), the process 300 may proceed to block 308, wherein the persistent duplex connection is closed. The process 300 may terminate at block 310.

The content management system process 350 shown in FIG. 3B begins at block 352. The process 352 may begin in response to an event, such as when a host device of the content management system 100 is powered on, when execution of a proxy server 110 and/or content server 112 begins, etc. When the process 350 is initiated, a set of executable program instructions stored on one or more non-transitory computer-readable media (e.g., hard drive, flash memory, removable media, etc.) may be loaded into memory (e.g., random access memory or "RAM") of a computing device of the content management system 100. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 354, the content management system 100 may receive a request from a user device 102 to establish a persistent duplex connection with the user device 102. For example, the request may come from a user device 102 executing the process 300 described above.

At block 356, a proxy server 110 or some other module or component of the content management system 100 can select a particular content server 112 with which to establish a connection with the user device 102. The proxy server 110 may select the particular content server 112 according to processing loads being handled by each content server 112 in order to balance the load across the servers. In some embodiments, a single host computing device may execute an instance of a proxy server 110, and one or more instances of a content server 112. The proxy server 110 instance can select a particular content server 110 instance to communicate with the user device 102.

At block 358, the proxy server 110 can establish the persistent connection with the selected content server 112. In some embodiments, the proxy server 110 may act as an endpoint for the secure connection from the user device 102, and a tunneled connection between the user device 102 and selected content server 112 may be established and maintained by the proxy server 110.

At block 360, the proxy server 110, content server 112, connection manager 114, or some other module or component of the content management system 100 can generate information regarding the mapping of the current user device 102 to the current content server 112. For example, the proxy server 110 can notify the connection manager of the connection between the current user device 102 and the current content server 112. Then, if another module or component of the content management system 100 is to send a command, notification, or other transmission to the user device 102, the component can access the appropriate content server 112 to initiate the transmission.

Upon establishment of the connection or at some time thereafter, the content server 112 may transmit a command to, or receive a command from, the content server 112 as part of a content browsing session. The core process 400 for handling the commands exchanged during the browsing session is shown in FIG. 4 and described in greater detail below. When the browsing session comes to an end (e.g., through user action or inaction, content server 112 command, etc.), the process 350 may proceed to block 362, wherein the persistent duplex connection is closed. The process 350 may terminate at block 364.

The core command-response process 400 shown in FIG. 4 may begin in response to an event, such as when a content browsing session is established between a user device 102 and a content server 112. Illustratively, the process may be part of the processes 300 and 350 described above. Thus, the process 400 may be embodied in sets of executable program instructions described above.

At decision block 402, a command manager or some other module or component of the user device 102 or content server 112 can determine whether the current content browsing session is active. If so, the process 400 may proceed to each of the blocks 404, 408, 412, and 416. The execution of process 400 may proceed in a sequential manner in which blocks 404, 408, 412, and 416 are executed in some predetermined or dynamically determined order before returning to decision bock 402. In some embodiments, blocks 404, 408, 412, and/or 416 are executed in parallel threads of execution. In some embodiments, the execution of process 400 may proceed in an event-driven manner in which blocks 404, 408, 412, and 416 are not necessarily executed in any sequential or parallel manner. Instead, the branches at each of blocks 404, 408, 412, and 416 may be executed in response to an event. For example, the execution of the branch beginning at block 412 may be triggered by receipt of a command, rather than requiring a periodic evaluation of whether a new command has been received.

At decision block 404, the command manager can determine whether to transmit a new command. If a new command is to be transmitted, the process 400 can proceed to block 406 to transmit the command over the appropriate channel.

Figure 5A:
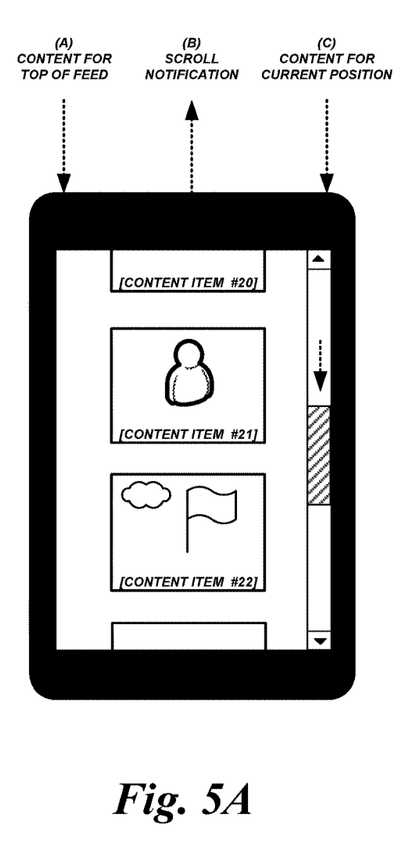
FIGS. 5A and 5B are pictorial diagrams of an illustrative user device receiving and displaying a content feed according to some embodiments.

FIG. 5A shows a user device 102 receiving content from a content server 112 at (A). Even though the content for the content feed is actively being received, the user device 102 may transmit commands to the content sever 112 over the persistent duplex connection. For example, when the user has scrolled to a different portion of the feed, the user device 102 can transmit a command to obtain content corresponding to the scroll operation at (B). The duplex connection allows content for the portion of the content feed to which the user scrolled to be retrieved in parallel with other content, rather than waiting for the receipt of content at (A) to continue until enough content has been retrieved to show the user the portion of the content feed to which the user scrolled.

Returning to FIG. 4, at decision block 408, the command manager or some other module or component can determine whether a response to a previously-transmitted command (or a transmission not necessarily associated with a previously-transmitted command) has been received. If a response has been received, the process 400 can proceed to block 410, where the command manager can add the response to the queue associated with the channel over which the response was received. In some embodiments, responses may not be placed in a queue. Rather, responses may be handled upon receipt or shortly thereafter. For example, a user device 102 may have a "listener" component that monitors the persistent connection for receipt of a response. Upon detecting receipt of a response, the listener component can initiate processing of the response without placing the response in a channel-specific queue.

FIG. 5A shows receipt of a response to the scroll position command that was previously transmitted as described above. The response may include content associated with the position to which the user has scrolled within the content feed. The response may be added to a queue on the user device 102 for processing and display.

At decision block 412, the command manager or some other module or component can determine whether a command has been received over the persistent duplex connection. If a command has been received, the process 400 may proceed to block 414 where the command manager can add the command to the queue associated with the channel over which the command was received.

Figure 5B:
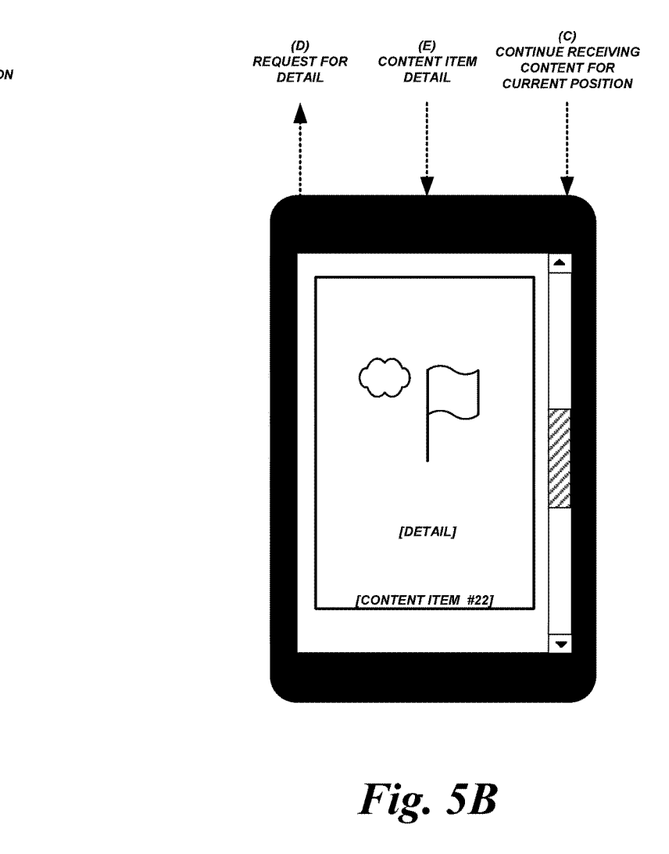

FIG. 5B shows transmission of a command from the user device 102 to the content server at (D). As shown, the command may be a request to obtain a particular content item that the user has activated within the content feed. The content server 112 can store the command in a queue associated with the channel over which the command was received.

At block 416, the command manager can determine the queue from which to obtain a command for execution. As described above, the command manager may cycle through the queues according to a round-robin process, or the command manager may use some other process for determining which queue to access next. At block 418, the command manager can execute the next command in the determined queue. In some embodiments, execution of the command may depend upon the specific configuration information associated with device executing the process 400, as discussed in greater detail above. After execution of the command, a response may be generated and transmitted at block 420. Some commands may not require or result in the transmission of a response, while other commands may require or result in the transmission of multiple responses. For example, a request to open a content feed may result in the content server 112 transmitting multiple responses, with each response including one or a subset of the content items in the content feed.

FIG. 5B shows transmission of a response to the user device 102 at (E). As shown, the response may be the detailed content item information for the content item that the user previously activated and triggered transmission of a command to the content server 112.

Efficient Synchronization of Content State

Figure 6:
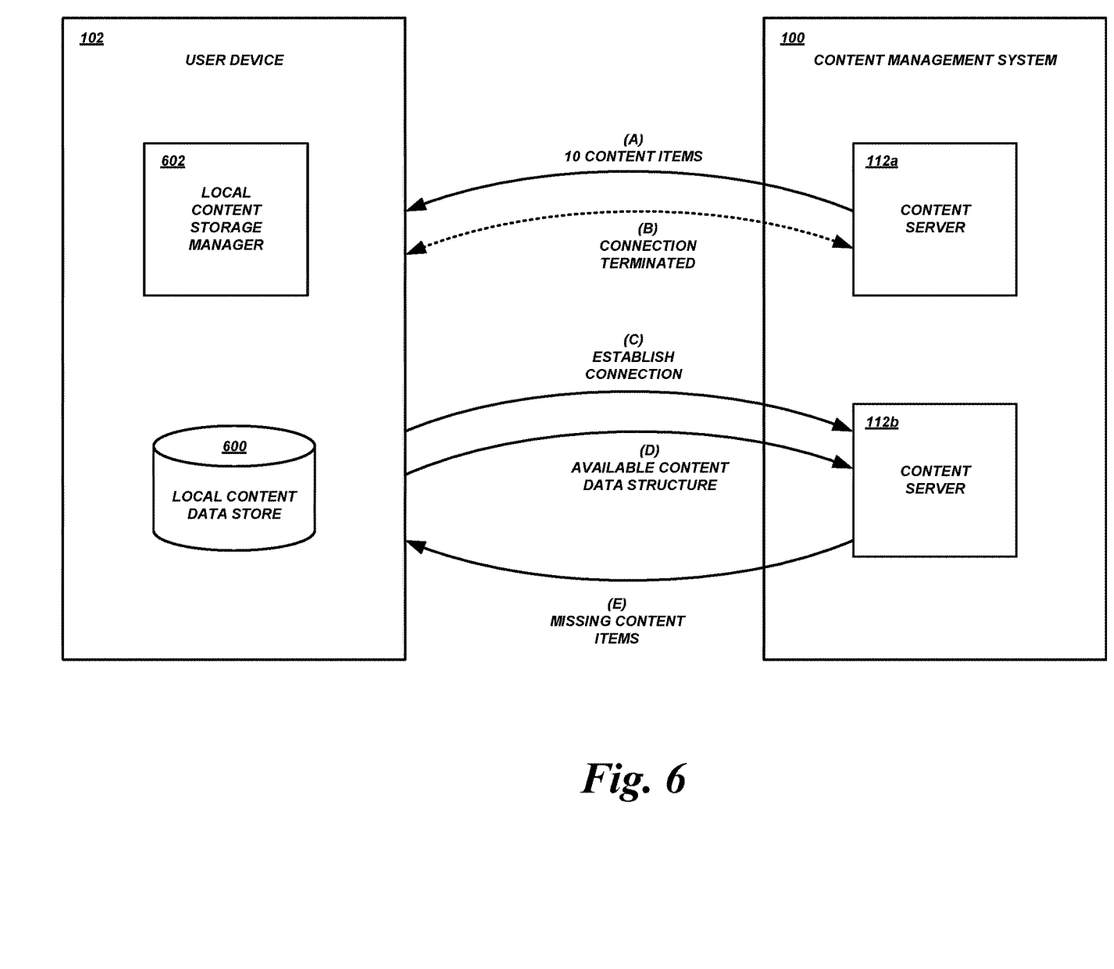
FIG. 6 is a block diagram of a user device communicating with multiple content servers over a persistent duplex network connection according to some embodiments.

FIG. 6 shows an illustrative user device 102 exchanging information with a content management system 100 regarding the content that is locally available at the user device 102. In some embodiments, the user device 102 can provide information about the content that is available locally so that the content management system 100 does not re-transmit such content to the user device 102. The content management system 100 can then use the data to determine which content to transmit to the user device 102 and/or to determine which content to avoid re-transmitting to the user device 102. Rather than merely providing a list of all content items available locally, the user device 102 can generate a compact, probabilistic data structure such as a Bloom filter that includes encoded information regarding the individual content items that the user device 102 has available locally. The compact probabilistic data structure may also be referred to as an "available content data structure." Any increase in processing time and power required to generate the available content data structure may be less than the corresponding reduction in time and power realized by avoiding the transmission of larger lists of all content items available locally or the unnecessary re-transmission of content items. In this way, both the user device 102 and the content management system 100 can work together to reduce the resources required to provide a user with a content feed, saving the user device 102 and the content management system 100 processing time, power, bandwidth, and the like.

As shown in FIG. 6, the user device 102 may have a local content data store 600 in which individual content items received from the content management system 100 are stored. For example, the user device 102 may initially be connected with a particular content server of the content management system 100, such as content server 112a. During the course of a content browse session, the user device 102 may obtain ten content items from the content server 112a at (A). The user device 102 may include a local content storage manager 602 to manage the storage of content items locally. The local content storage manager 602 can store the received content items in the local content data store 600.

The content items may each be associated with a different unique identifier, such as an ID number. In the present example, the ten content items may be associated with ID numbers 1-10, respectively. In some embodiments other identifiers may be used, such as string-based identifiers, hashes, or the like.

The connection with the content server 112a may be terminated at (B). For example, the user may have ended the content browse session, the user device 102 may have lost network connectivity, the user device 102 may be automatically reassigned to a different content server for load-balancing purposes, etc. The user device 102 may establish a connection with a different content server 112b at (C). To avoid the unnecessary re-transmission of the ten content items previously received from content server 112a, the user device 102 may provide an available content data structure to the new content server 112b at (D).

The local content storage manager 602 of the user device 102 can generate the available content data structure when it is to be sent to the content server 112b. For example, the local content storage manger 602 can generate a Bloom filter or other compact probabilistic data structure that includes encoded information regarding the various content items (e.g., encoded ID numbers for each content item) currently available in the local content data store 600.

The content server 112b can then inspect the available content data structure when the content server 112b is determining which content to transmit to the user device 102. For example, if the content server 112b has determined that content items with ID numbers 3-7 and 11-15 are to be included in the user's content feed, the content server 112b can check the available content data structure for the presence of content item ID numbers corresponding to each of content items. In the current example, the content server 112b can determine that ID numbers 3-7 may be present in the available content data structure, and therefore the corresponding content items do not need to be transmitted to the user device 102. The content server 112b can determine that ID numbers 11, 12, 13, and 15 are not be present in the available content data structure, and therefore the content server 112b may transmit the corresponding content items to the user device 102 at (E).

Figure 7:
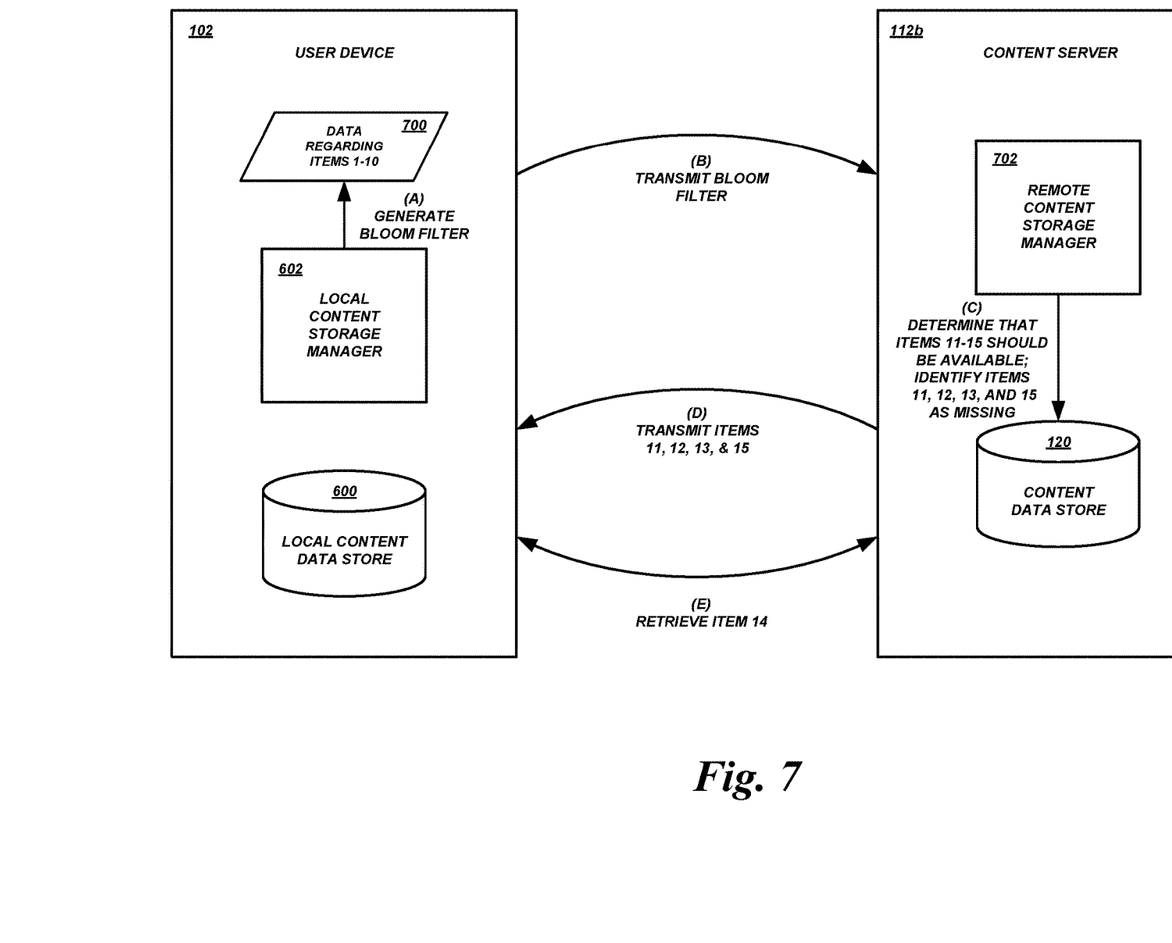
FIG. 7 is a block diagram illustrating operations performed by a user device and a content server during state synchronization according to some embodiments.

FIG. 7 shows example interactions and data flows between the user device 102 and content server 112b when the available content data structure is implemented as a Bloom filter. Bloom filters are used to test whether an element is a member of a set. In the present example, the Bloom filter can represent the set of content items currently available in the local content data store 600 of the user device 102 (e.g., ID numbers for the content items in the local content data store 600 will be encoded into the Bloom filter). A characteristic of Bloom filters is that false positive matches are possible, but false negatives are not. For example, the Bloom filter may occasionally indicate that an ID number is present in the Bloom filter's set of ID numbers that represent the content in the local content data store 600, even when the ID number was not specifically encoded into the Bloom filter. However, a Bloom filter will never indicate that an ID number is not present in the Bloom filter's set of ID numbers if in fact ID number was encoded into the Bloom filter. Thus, a query of a properly constructed Bloom filter will return either "probably in set" or "definitely not in set." In the context of encoding content item ID numbers, such query results mean that a content server 112b can determine with certainty that the user device 102 does not have a given content item, and therefore the content server 112b can provide the content item to the user device 102 without risking an unnecessary re-transmission. However, the content server 112b may not be able to determine with 100% certainty that the user device 102 already has a particular content item. Thus, the content server 112b may occasionally neglect to send a content item to the user device 102 that the content server 112b would have sent if the content server 112b had a 100% accurate representation of the content available on the user device 102. This occasional failure to send a content item can be remedied by the user device 102. For example, the user device 102 can simply request any missing content items from the content server 112b.

When the user device 102 is preparing to generate the Bloom filter, the local content storage manager 602 can allocate memory for an array that will store the encoded content item ID numbers. The amount of memory allocated and the size of the array can vary depending on the number of content items to be encoded into the data structure. The false positive rate of a Bloom filter increases as more content item ID numbers are encoded into a Bloom filter of a given size. When a Bloom filter is too small for the amount of information encoded into it, the false positive rate may be higher than desired. Thus, the size of the array (e.g., the number of individual elements of the array) should be substantially larger than—but may nevertheless be proportionate to—the number of content items to be represented within the Bloom filter (e.g., a Bloom filter used to encode 1,000,000 ID numbers will typically be implemented using a larger array than a Bloom filter used to encode 100 ID numbers).

The local content storage manager 602 may select an array size for the Bloom filter based on a target false positive rate, a target amount of memory for the Bloom filter, a target amount of bandwidth required to transmit the Bloom filter, some combination thereof, etc. For example, if the content item ID numbers are 64 bit numbers, a Bloom filter with 8,000 content item ID numbers and a false positive rate of 1 in $10^9$ would be about 22 kilobytes ("kB") in size. A Bloom filter for 16,000 such content item ID numbers and the same 1 in $10^9$ false positive rate would be about 38 kB in size. In comparison, an unencoded and uncompressed list of 16,000 such content ID numbers would be about 1,000 kB in size.

As shown in FIG. 7, the local content storage manager 602 can generate a Bloom filter 700 at (A). Returning to the example above, the Bloom filter 700 can encode the ID numbers for the content items previously received from content server 112a (e.g., ID numbers 1-10). The user device 102 can then transmit the Bloom filter 700 to the content server 112b at (B).

The content server 112b can use the Bloom filter 700 when generating a content transmission. For example, the content server 112b may determine that the content feed displayed on the user device 102 is to include content items with ID numbers 3-7 and 11-15. The content server 112b may include a remote content storage manager 702 configured to analyze the Bloom filter 700 and determine which of the selected content items are already present on the user device 102 (or are "probably" present on the user device 102). At (C), the remote content storage manager 702 may use the Bloom filter 700 to determine that content items with ID numbers 3-7 are already present on the user device 102, and therefore the content items are not to be retransmitted. Due to the probabilistic nature of the Bloom filter 700, content item ID number 14 may also be determined to likely be in present in the Bloom filter 700, and therefore the content server 112b can determine not to "retransmit" content item 14 either. The remote content storage manager 702 can also determine that content items with ID numbers 11, 12, 13, and 15 are definitely not present on the user device 102. At (D), the content server 112b may transmit content items 11, 12, 13, and 15 to the user device 102.

The user device 102 may prepare the content feed for display, and may determine that content item 14 should be included but is not present, even after receiving the transmission from the content server 112b at (D). The user device 102 may then retrieve the missing content item from the content server 112b at (E) so that all of the content that the content server 112b expected to be available on the user device 102 is indeed available. This extra request for the missing content item consumes substantially less bandwidth, power, resources, and processing time than receiving duplicate content items from the content server 112b, and therefore the inaccuracies introduced by using the probabilistic Bloom filter 700 do not outweigh its benefits.

In some embodiments, the user device 102 and content server 112b may establish a checkpoint after an exchange such as the one shown in FIG. 7 and described above. For example, the user device 102 and content server 112b may determine that they are now synchronized regarding which content items the user device 102 has available locally. Bloom filters generated after the time of the checkpoint can therefore be generated to represent only the content received by the user device 102 after the checkpoint, without adding content item ID numbers for all of the content items received before the checkpoint. The content server 112b can store information regarding the checkpoint. The information may be stored such that in the future the content server 112b or another content server can focus on providing content generated after the checkpoint, or providing content first selected for the user's content feed after the checkpoint. For example, the checkpoint information may be stored in the user data store 120. In some embodiments, the user device 102 or content server 112b may request synchronization and establishment of a checkpoint. For example, if the user device 102 has received, from the content server 112b, more than a threshold number content items that the user device 102 already has available in the local content data store 600, then the user device 102 may transmit a Bloom filter or a command or request for synchronization. As another example, if the user device 102 has received, from the content server 112b, more than a threshold number of references to content erroneously expected to be in the local content data store 600, then the user device 102 may transmit a Bloom filter or a command or request for synchronization.

Figure 8:
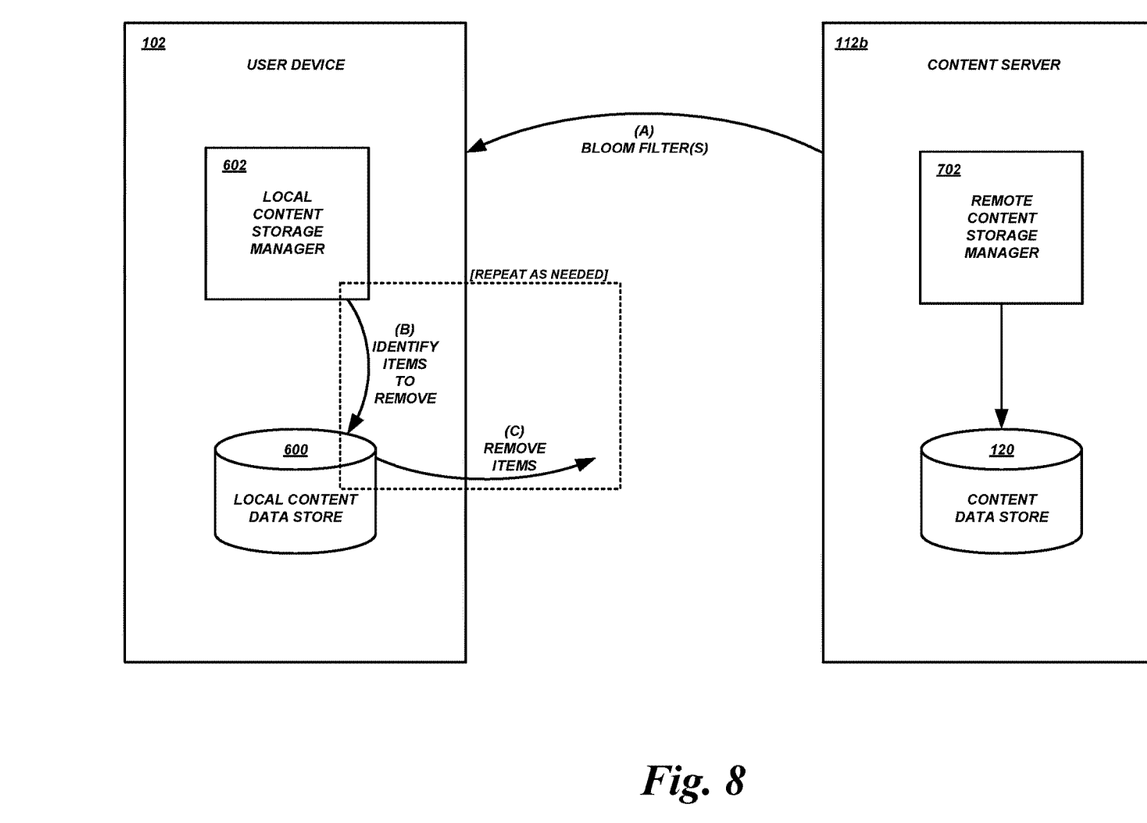
FIG. 8 is a block diagram of a content server providing multiple groups of content state information to a user device during state synchronization according to some embodiments.

FIG. 8 shows example interactions and data flows between the user device 102 and content server 112 when the content server 112 provides one or more Bloom filters (or other available content data structures) to the user device 102 instead of, or in addition to, the user device 102 providing a Bloom filter to the content server 112. In some embodiments, the content server 112 may provide data regarding the content items that the user device 102 should not retain in the local content data store 600 and/or content items that the user device 102 is permitted to retain in the local content data store 102. The data may be provided to the user device 102 before receiving an available content data structure from the user device 102, after receiving an available content data structure, in parallel with receiving an available content data structure, or without receiving any available content data structure from the user device 102.

As shown in FIG. 8, the Bloom filter(s) can be provided to the user device 102 at (A). Depending upon the purpose of any particular Bloom filter, the local content storage manager 602 of the user device 102 can perform different operations at (B). For example, if the Bloom filter includes encoded ID numbers for content items that the user device 102 is permitted to retain, the local content storage manager 602 can query the Bloom filter using the ID number for each content item stored in the local content data store 600. For any ID numbers that have not been encoded into the Bloom filter, the local content storage manager 602 can remove the content item from the local content data store 600 at (C). As another example, if the Bloom filter includes encoded ID numbers for content items that the user device 102 is not permitted to retain, the local content storage manager 602 can query the Bloom filter using the ID number for each content item stored in the local content data store 600. For any ID numbers that have been encoded into the Bloom filter (or have "probably" been encoded into the Bloom filter), the local content storage manager 602 can remove the content item from the local content data store 600 at (C). In some embodiments, both of these example Bloom filters may be provided to the user device 102, and the user device 102 may repeat the processing as needed at (B) and (C).

In some embodiments, the content server 112 may provide multiple Bloom filters corresponding to other groupings of content. For example, the content server 112 may provide a first Bloom filter regarding content that should be urgently removed from the local content data store 600, and a second Bloom filter of content that should eventually be removed from the local content data store 600. The user device 102 may then process the Bloom filters according to their associated priority. The example Bloom filters discussed above are illustrative only, and are not intended to be limiting. In some embodiments, other Bloom filters may be provided to a user device 102 based on other groupings of content. For example, Bloom filters associated with different types of content may be provided (e.g., one Bloom filter for images, one Bloom filter for videos, one Bloom filter for documents, etc.). As another example, Bloom filters associated with different content topics or categories may be provided. In some embodiments, a content server 112 may provide data to a user device 102 (in the form of a probabilistic data structure such as a Bloom filter) regarding content items that are to be removed from the local content data store 600 on an urgent or prioritized basis. Such data may be provided before, or at any time during, the user device's 102 content browsing session. For example, there may be a content item that presents a security or for which it is otherwise undesirable to have the content item stored in the local content data store 600. The content server 112 can generate a Bloom filter with encoded information regarding the content item, and transmit the Bloom filter to the user device 102 (e.g., over a high-priority channel). The user device can then access content items in local content data store 600, determine whether any content items are referenced by the Bloom filter and, if so, remove the content item(s) from the local content data store 600.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a content data store storing a plurality of content items; and
one or more processors in communication with the content data store, the one or more processors configured to at least:
obtain identifiers for individual content items of the plurality of content items;
generate a Bloom filter comprising encoded information corresponding to the identifiers for the individual content items;
transmit the Bloom filter to a network-accessible content server;
in response to transmission of the Bloom filter, receive a first content item from the network-accessible content server, wherein the first content item is associated with a first identifier, and wherein the Bloom filter does not comprise encoded information corresponding to the first identifier;
transmit a content feed request to the network-accessible content server;
in response to transmission of the content feed request, receive a second content item and content feed data, wherein the content feed data references the first content item and the second content item; and
cause display of a content feed comprising the first content item and the second content item.

2. The system of claim 1, wherein the one or more processors are further configured to at least determine a size of the Bloom filter based at least partly on a desired false positive rate and a number of content items in the plurality of content items.

3. The system of claim 1, wherein the one or more processors are further configured to at least:
receive, from the network-accessible content server, a second Bloom filter comprising encoded information regarding identifiers for a subset of the plurality of content items; and
remove the subset of the plurality of content items from the content data store.

4. The system of claim 1, wherein the one or more processors are further configured to at least:
generate checkpoint data regarding a time at which the Bloom filter was generated; and
generate a second Bloom filter comprising encoded information corresponding to identifiers for only content items stored in the content data store after the time at which the Bloom filter was generated.

5. A computer-implemented method comprising:
as performed by a first computing system comprising a processor configured to execute specific instructions,
receiving, from a second computing system, a probabilistic data structure comprising encoded information regarding a plurality of content items stored on the second computing system;
selecting a content item, from a corpus of available content items, to be stored on the second computing system;
determining that the probabilistic data structure does not comprise encoded information regarding the content item;
transmitting the content item to the second computing system;
generating a second probabilistic data structure, wherein the second probabilistic data structure comprises encoded information regarding a second plurality of content items that are not permitted to be stored on the second computing system; and
transmitting the second probabilistic data structure to the second computing system.

6. The computer-implemented method of claim 5, wherein the probabilistic data structure comprises a Bloom filter.

7. The computer-implemented method of claim 5, wherein the encoded information regarding the plurality of content items comprises encoded information regarding unique identifiers for individual content items of the plurality of content items.

8. The computer-implemented method of claim 5, further comprising:
selecting a second content item, from the corpus of available content items, to be stored on the second computing system;
determining that the probabilistic data structure likely comprises encoded information regarding the second content item; and
determining not to transmit the second content item to the second computing system.

9. The computer-implemented method of claim 5, further comprising:
determining a plurality of content items that are permitted to be stored on the second computing system;
generating a third probabilistic data structure comprising encoded information regarding the plurality of content items that are permitted to be stored on the second computing system; and
transmitting the third probabilistic data structure to the second computing system.

10. The computer-implemented method of claim 5, further comprising:
generating the second probabilistic data structure as a high priority probabilistic data structure comprising encoded information regarding content items for which removal from storage on the second computing system is to be prioritized;
generating a third probabilistic data structure as a low priority probabilistic data structure comprising encoded information regarding content items for which removal from storage on the second computing system is permitted to be delayed for a period of time; and
transmitting the priority third probabilistic data structure to the second computing system.

11. The computer-implemented method of claim 5, wherein the probabilistic data structure is received over a first channel of a persistent bi-directional connection comprising a plurality of multiplexed communication channels, and wherein the content item is transmitted to the second computing system over the first channel.

12. A non-transitory computer storage medium storing executable instructions that, when executed by one or more processors of a first computing system, cause the one or more processors to perform a process comprising:
transmitting, to a second computing system, a probabilistic data structure comprising encoded information regarding a plurality of content items stored on the first computing system;
receiving a content item from the second computing system, wherein the probabilistic data structure does not comprise encoded information regarding the content item;
receiving, from the second computing system, a second probabilistic data structure comprising encoded information regarding a second plurality of content items that are not permitted to be stored on the first computing system;
determining that the second probabilistic data structure likely comprises encoded information regarding a second content item; and
removing the second content item from a local content data store.

13. The non-transitory computer storage medium of claim 12, wherein the probabilistic data structure comprises a Bloom filter.

14. The non-transitory computer storage medium of claim 12, wherein the encoded information regarding the plurality of content items comprises encoded information regarding unique identifiers for each of the plurality of content items.

15. The non-transitory computer storage medium of claim 12, the process further comprising:
selecting a third content item from the local content data store;
determining that the second probabilistic data structure does not comprise encoded information regarding the third content item; and
determining not to remove the third content item from the local content data store.

16. The non-transitory computer storage medium of claim 12, the process further comprising:

generating the probabilistic data structure comprising encoded information regarding content items stored in the local content data store.

17. The non-transitory computer storage medium of claim 16, wherein the probabilistic data structure is generated after receiving, from the second computing system, a content feed comprising a plurality of content items.

18. The non-transitory computer storage medium of claim 16, wherein the probabilistic data structure is generated after determining that the second computing system has transmitted a content item already present in the local content data store.

19. The non-transitory computer storage medium of claim 12, the process further comprising receiving a third content item from the second computing system, wherein both the probabilistic data structure and the second probabilistic data structure do not comprise encoded information regarding the third content item.

20. The non-transitory computer storage medium of claim 12, the process further comprising generating checkpoint data regarding a time at which the second probabilistic data structure was received.

21. The non-transitory computer storage medium of claim 12, the process further comprising receiving a third probabilistic data structure comprising encoded information regarding content items for which removal from the local content data store is permitted to be delayed for a period of time.

* * * * *